United States Patent [19]
Sons

[11] 3,840,780
[45] Oct. 8, 1974

[54] DETECTOR-PROTECTOR CIRCUIT
[75] Inventor: James E. Sons, Sanger, Tex.
[73] Assignee: Detprotector, Inc., Dallas, Tex.
[22] Filed: Mar. 19, 1973
[21] Appl. No.: 342,398

Related U.S. Application Data
[63] Continuation of Ser. No. 150,541, June 7, 1971, abandoned.

[52] U.S. Cl. ......... 317/13 R, 317/27 R, 317/33 SC, 340/253 R
[51] Int. Cl. ............................................ H02h 7/09
[58] Field of Search ............... 340/248, 253, 255; 317/18 R, 31, 33 SC, 27 R, 13 R

[56] References Cited
UNITED STATES PATENTS
3,243,658   3/1966   Blackburn ........................ 317/31
3,633,072   1/1972   Duncan ........................... 317/27 R

*Primary Examiner*—James D. Trammell
*Attorney, Agent, or Firm*—Richards, Harris & Medlock

[57] ABSTRACT

A detector-protector circuit includes monitoring circuits each individual to a component of an electrical device. Each monitoring circuit is responsive to a malfunction of its associated component to disable the electrical device and to actuate an indicator lamp. In one embodiment of the invention the components are limit switches in the electrical device and each monitoring circuit is responsive to actuation of its respective limit switch. In another embodiment of the invention the components are power leads extending to a three-phase motor and each monitoring circuit is responsive to a decrease in the rate of current flow through its respective lead.

13 Claims, 2 Drawing Figures

DETECTOR-PROTECTOR CIRCUIT

This is a continuation of application Ser. No. 150,541, filed June 7, 1971, now abandoned.

BACKGROUND AND SUMMARY OF THE INVENTION

This invention relates to a detector-protector circuit, and more particularly to an alarm which simultaneously locates problems in an electrical apparatus and prevents damage to the apparatus.

Virtually every modern electrical apparatus is equipped with numerous limit switches that respond to abnormal operating conditions to terminate operation of the apparatus. One difficulty that can arise in the maintenance of such an electrical apparatus may be referred to as limit switch cascading. That is, the actuation of one limit switch in response to a particular problem in an electrical apparatus can result in the actuation of several other limit switches in rapid succession. When this occurs, it is often very inconvenient to isolate and correct the problem that caused the actuation of the first limit switch.

Similar difficulties can arise in the use of three-phase electrical equipment. For example, one phase of the power supply of a three-phase electric motor may drop out, in which event the operating temperature of the motor can rise very rapidly. Various devices have been provided heretofore for detecting such phase drop outs. However, most of the prior art devices have been so slow in operation that serious damage can occur before the problem is detected and protective action taken.

The present invention comprises a novel detector-protector circuit which overcomes the foregoing and other disadvantages that are characteristic of the prior art. The invention preferably comprises an alarm including indicator lamps each associated with one circuit of a group, a plurality of conductive paths each associated with a circuit of the group and all connected in series with each other and with a power flow circuit for the circuits of the group, and monitoring circuits each associated with a circuit of the group and responsive to a malfunction of the associated circuit to interrupt the associated conductive path and actuate the associated indicator lamp. More specifically, the circuits of the group may comprise limit switches, in which case each monitoring circuit responds to an opening of its associated limit switch, or power leads for a polyphase electrical device, in which case each monitoring circuit responds to a decrease in current flow through its associated lead.

DESCRIPTION OF THE DRAWING

A more complete understanding of the invention may be had by referring to the following detailed description when taken in conjunction with the accompanying drawing, wherein.

DETAILED DESCRIPTION

Figure 1:
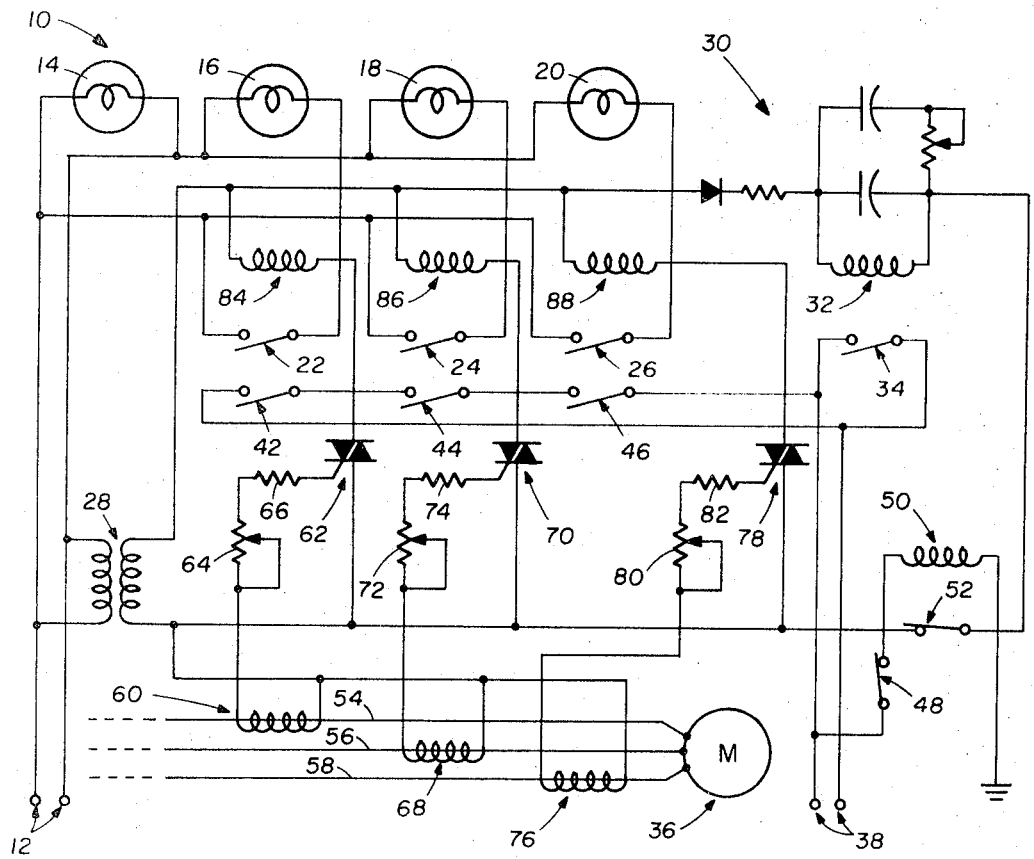
FIG. 1 is a schematic illustration of a detector-protector circuit comprising a first embodiment of the invention.

Referring now to the drawing, and particularly to FIG. 1 thereof, there is shown a detector-protector circuit 10 comprising a first embodiment of the invention. Conventional 110 Volt, 60 Hertz line current is supplied to the circuit 10 through a pair of terminals 12. The terminals 12 are connected directly across an ON lamp 14 and are connected to three phase indicator lamps 16, 18, and 20 through three normally open contact pairs 22, 24, and 26 each individual to one of the phase indicator lamps. The terminals 12 are also connected to the primary winding of a transformer 28.

The secondary winding of the transformer 28 is connected through an R-C network 30 to the coil of a relay 32. Thus, the relay 32 is initially energized and a normally open contact pair 34 of the relay 32 is initially closed.

An otherwise conventional control circuit for a three-phase motor 36 is coupled to the detector-protector circuit 10 through a pair of terminals 38. The terminals 38 are interconnected through the normally open, now closed contact pair 34 and through three normally open contact pairs 42, 44, and 46. One of the terminals 38 is also connected to ground through a reset switch 48 and the coil of a relay 50. Thus, upon actuation of the control circuit to start the motor 36, the relay 50 is energized and a normally closed contact pair 52 of the relay 50 is opened.

The contact pair 52 of the relay 50 is connected in series with the winding of the relay 32. Thus, upon actuation of the control circuit to start the motor 36, the circuit from the transformer 28 to the relay 32 is broken, and the relay 32 is de-energized. However, the normally open contact pair 34 of the relay 32 does not open instantaneously upon energization of the relay 50 in that the R-C network 30 maintains the relay 32 energized for a predetermined period of time.

Three leads 54, 56, and 58 extend to the motor 36 from a source of three-phase electrical power. It will be understood that under normal operating conditions, actuation of the control circuit to start the motor 36 results in current flow through the leads 54, 56 and 58. The lead 54 extends through a current transformer 60 which is connected to the gate terminal of a triac 62 through a variable resistor 64 and a fixed resistor 66. Similarly, the lead 56 extends through a current transformer 68 which is connected to the gate terminal of a triac 70 through a variable resistor 72 and a fixed resistor 74, and the lead 58 extends through a current transformer 76 which is connected to the gate terminal of a triac 78 through a variable resistor 80 and a fixed resistor 82.

The current transformers 60, 68, and 76 are responsive to current flow through their associated leads 54, 56, and 58 to turn their associated triacs 62, 70, and 78 "on." When the triacs 62, 70, and 78 are "on," the secondary winding of the transformer 28 is connected across the coils of three relays 84, 86, and 88. Upon operation, the relays 84, 86, and 88 close their respective normally open contact pairs 22, 42, and 24 and 44, 26, and 46. By this means, the lamps 16, 18, and 20 are illuminated to indicate that current is flowing to the motor 36 through each of the leads 54, 56, and 58.

Operation of the relays 84, 86, and 88 also interconnects the terminals 38 through the normally open, now closed contact pairs 42, 44, and 46. By this means, the control circuit for the motor 36 remains actuated, and the motor 36 continues to run. It will be appreciated that if any of the contact pairs 42, 44, and 46 is not closed before the contact pair 34 opens, the control circuit for the motor 36 is opened and the motor 36 is therefore immediately stopped. Similarly, should any phase of the power supply for the motor 36 substantially drop out, the control circuit for the motor will become de-energized, and the motor will be stopped.

Those skilled in the art will appreciate the fact that the detector-protector circuit 10 illustrated in FIG. 1 of the drawing operates to prevent damage to the motor 36 due to phase drop out. Thus, during starting of the motor 36, current flow must be established in each of the leads 54, 56, and 58 during the time period of the R-C network 30. Otherwise, the control circuit for the motor 36 will be opened, and the operation of the motor will therefore be stopped. Similarly, if current flow is discontinued in any of the leads 54, 56, and 58 at any time subsequent to starting of the motor, the control circuit for the motor will be opened, and operation of the motor will therefore be stopped. In either case the detector-protector circuit 10 operates very rapidly so that the motor is not damaged.

The detector-protector circuit 10 can be restored to its initial condition by first opening then closing the reset switch 48. Thereafter, the control circuit can be actuated through the terminals 38 to re-start the motor 36. However, unless the condition which caused the detector-protector circuit 10 to discontinue operation of the motor 36 has been recognized, the circuit 10 will again function to prevent operation of the motor 36. In such a situation, the circuit 10 is useful in isolating the phase that has dropped out. Thus, assuming that the control circuit is actuated to start the motor 36, and further assuming that actuation of the control circuit does not result in current flow through the lead 54, the phase indicator lamps 18 and 20 will be temporarily illuminated, but the phase indicator lamp 16 will not be illuminated. By this means, the particular phase of the motor power supply which has dropped out is positively identified.

Figure 2:
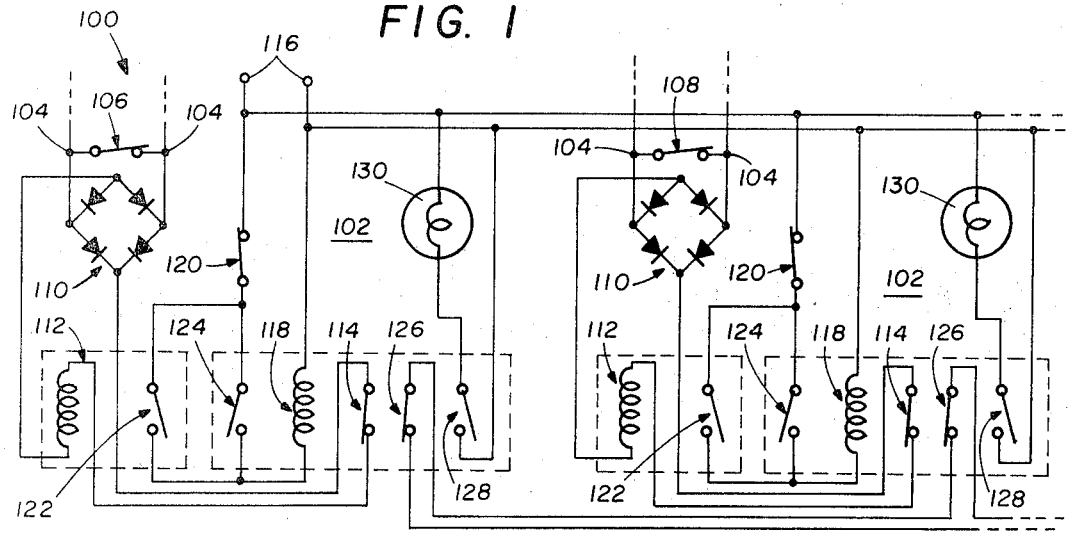
FIG. 2 is a schematic illustration of the detector-protector circuit comprising the second embodiment of the invention.

Referring now to FIG. 2, there is shown a detector-protector circuit 100 comprising the second embodiment of the invention. The circuit 100 comprises a number of subcircuits 102 each including a pair of terminals 104 which are connected to the terminals of a limit switch in an electrical apparatus. For example, the terminals 104 of the subcircuit 102 shown on the left-hand side of FIG. 2 are coupled to the terminals of a limit switch 106 whereas the terminals 104 of the subcircuit 102 shown on the right-hand side of FIG. 2 are coupled to the terminals of a limit switch 108. It will be understood that the detector-protector circuit 100 may comprise as many subcircuits 102 as are necessary to monitor all of the limit switches of a particular electrical apparatus.

The terminals 104 of each subcircuit 102 are connected to the input of a full wave rectifier 110. The output of the full wave rectifier 110 is connected to the winding of a relay 112 through a normally closed contact pair 114. Thus, if the limit switch associated with the particular subcircuit 102 is opened for any reason, the current that was formerly carried by the limit switch is directed through the coil of the relay 112, whereupon the relay 112 is operated.

The detector-protector circuit 100 receives conventional 115 VOlt, 60 Hertz line current through a pair of terminals 116. Upon operation of the relay 112, the terminals 116 are coupled to the winding of a relay 118 through a normally closed reset switch 120 and a normally open, now closed contact pair 122 of the relay 112. This action immediately operates the relay 118, whereupon the relay 118 locks operated through a normally open, now closed contact pair 124. Operation of the relay 118 also opens the normally closed contact pair 114, whereupon the relay 112 is de-energized. Finally, operation of the relay 118 opens a normally closed contact pair 126 and closed a normally open contact pair 128.

The contact pairs 126 of the various subcircuits 102 of the detector-protector circuit 100 are connected in series with the power supply of the electrical apparatus which includes the limit switches that are monitored by the circuit 100. Thus, whenever one of the limit switches opens in response to an abnormal operating condition within the electrical apparatus, the detector-protector circuit 100 functions to immediately disable the entire electrical apparatus.

The contact pair 128 of each subcircuit 102 is preferably connected in series with an indicator lamp 130. Thus, the opening of any limit switch within an electrical apparatus in response to an abnormal operating condition within the apparatus immediately illuminates an associated indicator lamp. By this means, the limit switch in question is quickly identified, and the source of the problem that caused the opening of the limit switch is readily located.

The detector-protector circuit 100 may be restored to its initial condition by momentarily opening and then closing the reset switch 120 associated with the illuminated indicator lamp 130. However, unless the condition that caused the actuation of the relevant limit switch in the electrical appparatus has been corrected, the limit switch will eventually be reactuated, whereupon the detector-protector circuit 100 will again disable the electrical apparatus and illuminate the indicator lamp associated with the actuator limit switch. By this means the circuit 100 functions not only to protect the electrical apparatus, but also as an aid in locating the problem which is causing actuation of the limit switch.

From the foregoing, those skilled in the art will realize that the present invention comprises a detector-protector circuit which is easily manufactured from readily available components and parts, and yet is extremely reliable and maintenance free in operation. It has been found that detector-protector circuits incorporating the invention operate extremely quickly to protect the malfunctioning electrical apparatus and three-phase equipment from damage. Perhaps more importantly, detector-protector circuits incorporating the invention are extremely useful in detecting the source of a malfunction in an electrical device.

Although preferred embodiments of the invention have been illustrated in the accompanying drawing and described in the foregoing specification, it will be understood that the invention is not limited to the embodiments disclosed, but is capable of rearrangement, modification and substitution of parts and elements without departing from the spirit of the invention.

What is claimed is:

1. In a system for controlling electrical power flow to a plurality of independent electrical systems forming a group and each having a limit switch connected across a power source that opens upon malfunction of its associated system, an alarm for interrupting power flow to all of the systems in said group when one of the systems malfunctions and for producing a visual indication to identify the particular malfunctioning system, said alarm comprising:

a malfunction indicator lamp associated with each system in said group;

a first relay associated with each system in said group and having a first set of normally closed contacts and a second set of normally open contacts, said first contact sets of all first relays being connected in series with one another and with the electrical power flow circuit to said group of systems and said second contact set of each first relay being connected to a power source and the associated indicator lamp to energize the lamp upon closure of the contacts; and monitoring means connected across the limit switch of each system in said group and to the associated first relay of each system for energizing said first relay upon opening of the switch to interrupt the electrical power flow path to said group and illuminate the lamp associated with the malfunctioning system.

2. The alarm set forth in claim 1 wherein:

each of said first relays include a third set of normally closed contacts and a fourth set of normally open contacts, the fourth contact set being series connected between a current source and the coil of its first relay; and each of said monitoring means includes a second relay having a normally open contact set connected across the fourth contact set of said first relay, the coil of said second relay being connected in series with the power source across the associated system limit switch and the third contact set of said first relay to energize said second relay upon opening of the limit switch and operate said first relay through the second relay contact set, said first relay being latched operated through its own fourth set of contacts.

3. The alarm set forth in claim 2 wherein each of said monitoring means includes a bridge rectifier having its input connected across the system limit switch and having its output connected to the coil of the second relay through the third contact set of the first relay.

4. In a system for controlling electrical power flow to a polyphase electric motor, an alarm for interrupting power flow to all phases when a malfunction occurs in power flow to any one of the phases and for producing a visual indication to identify the particular malfunctioning phase, said alarm comprising:

means having a pair of control terminals for supplying power to all phases of said electric motor in response to connection across said terminals;

a malfunction indicator lamp associated with each phase of said motor;

a relay associated with each phase of said motor, each relay having first and second sets of normally open contacts, said first contact set of each relay being serially connected between its associated lamp and a power source and the second contact sets of all of said relays being connected in series with one another and with the control terminals of said motor power supply means;

a start relay having a normally open contact set connected across said control terminals and a coil serially connected with a power source, a timing circuit and a start switch, said relay only remaining operated for a preselected period of time after closure of said start switch; and monitoring means associated with each of the phases and responsive to power flow through its phase for operating the associated relay to close its second contact set and thereby complete the series path between said control terminals only if all relays are operated, said power supply being interrupted if all relays are not operated prior to the end of said preselected period of time.

5. The alarm set forth in claim 4 wherein each of said monitoring means includes a gated semiconductor device connected in series with the coil of said relay and a source of current, the gate lead of said semiconductor device being connected to a coil positioned to monitor current flow to the associated phase of said motor.

6. The alarm set forth in claim 3 wherein said relay current source is alternating and said gated semiconductor device is a triac.

7. In a system for controlling electrical power flow to a plurality of independent electrical systems forming a group and each having a limit switch connected across a power source that opens upon malfunction of its associated system, an alarm for interrupting power flow to all of the systems in said group when one of the systems malfunctions, said alarm comprising:

a first relay associated with each system in said group and having a first set of normally closed contacts and a second set of normally open contacts, said first contact sets of all first relays being connected in series with one another and with the electrical power flow circuit to said group of systems, and monitoring means connected across the limit switch of each system in said group and to the associated first relay of each system for energizing said first relay upon opening of the switch to interrupt the electrical power flow path of said group.

8. In a system for controlling electrical power flow to a polyphase electric motor, an alarm for interrupting power flow to all phases when a malfunction occurs in power flow to any one of the phases, said alarm comprising:

means having a pair of control terminals for supplying power to all phases of said electric motor in response to connection of a series path across said terminals;

a start relay having a normally open contact set connected across said control terminals and a coil serially connected with a power source, a timing circuit and a start switch, said relay only remaining operated for a preselected period of time after closure of said start switch; and a gated semiconductor monitoring device associated with said phases and connected to an associated relay having a contact set, said semiconductor device responsive to power flow through said phases for operating the associated relay to close its contact set and thereby complete the series path between said control terminals only if all relays are operated, said power supply being interrupted if all relays are not operated prior to the end of said preselected period of time.

9. The alarm set forth in claim 8 and further comprising plural gated semiconductor monitoring devices connected in series with the coil of said associated relay and a source of current, the gate lead of said semiconductor device being connected to a coil positioned to monitor current flow to the associated phase of said motor.

10. The alarm set forth in claim 9 wherein said relay current source is alternating and said gated semiconductor device is a triac.

11. A system for interrupting electrical power flow to an a.c. polyphase electrical motor upon the occurrence of a malfunction in one of the phases comprising:
a plurality of current transformers each associated with one of the phases of the motor to detect the alternating current being applied to each of the phases of the motor,
a semiconductor triac device connected across a supply of bias voltage and having a gate terminal connected to at least one of said current transformers, wherein the state of said triac device is variable in response to a phase malfunction, and
a relay having a winding connected in series with said triac device and relay contacts connected to the control circuit of the electrical motor, said relay operable in response to a change of state of said triac device to deenergize said electrical motor.

12. The system of claim 11 and further comprising a predetermined resistance connected between said current transformers and said triac device.

13. A system for interrupting electrical power flow to an a.c. polyphase electrical motor upon the occurrence of a malfunction in one of the phases comprising:
a current transformer associated with one of the phases of the motor to detect the alternating current being applied to the phase of the motor,
a semiconductor triac device connected across a supply of bias voltage and having a gate terminal coupled to receive electrical signals from said current transformer, wherein the state of said triac device is variable between shorted and open states in response to a phase malfunction, and
an electromagnetic switch having a winding connected in series with said triac device and relay contacts connected to the control circuit of the electrical motor, said switch operable in response to a change of state of said triac device to deenergize said electric motor.

* * * * *